(No Model.)
P. H. SISSON.
ANIMAL TRAP.
No. 532,343.  Patented Jan. 8, 1895.
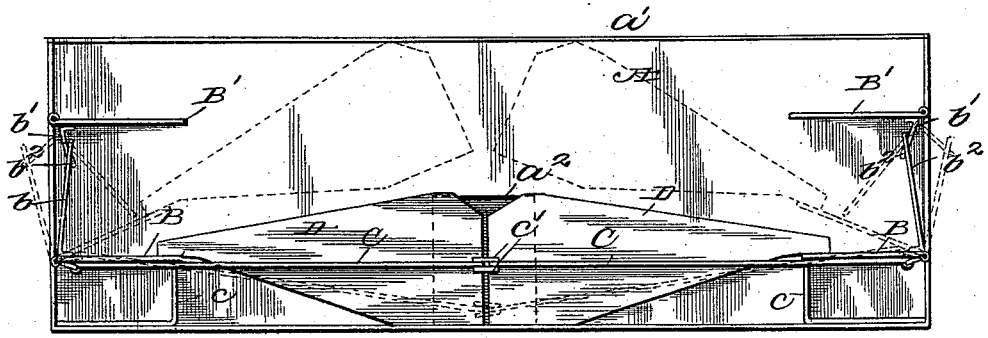
Fig. 1.
Fig. 2.
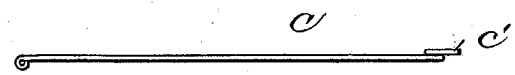
Fig. 3.
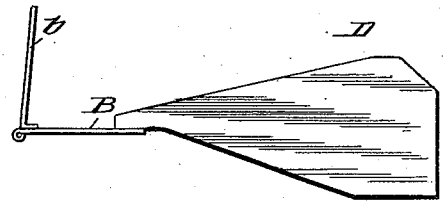
Witnesses
Inventor
Philander H. Sisson
By David H. Mead
his Attorney.

UNITED STATES PATENT OFFICE.

PHILANDER H. SISSON, OF EDGEWOOD, MICHIGAN.

ANIMAL-TRAP.

SPECIFICATION forming part of Letters Patent No. 532,343, dated January 8, 1895.

Application filed June 15, 1894. Serial No. 514,656. (No model.)

*To all whom it may concern:*

Be it known that I, PHILANDER H. SISSON, a citizen of the United States, residing at Edgewood, in the county of Gratiot and State of Michigan, have invented certain new and useful Improvements in Animal-Traps; and I do hereby declare the following to be a full, clear, and exact description of the invention, such as will enable others skilled in the art to which it appertains to make and use the same.

This invention relates to animal traps, and it relates particularly to traps for catching rats, mice, and other small animals.

The object of the invention is to produce an animal trap of the kind referred to, which shall be of such construction as to present an opening entirely through the trap when it is set, in order that there may be no hesitation on the part of the animals to enter.

Further the object of the invention is to produce an animal trap of the kind referred to wherein the weight of an animal will operate to close doors or shutters in the opening leading to the interior of the trap, and to retain the doors in a closed position until the animal is removed, or until it enters an inner chamber or receptacle in the trap.

With these objects in view the invention consists of an animal trap comprising an opening extending therethrough, doors pivoted to the top and bottom of each entrance, and a platform arranged in the passage and connected to the doors.

Further the invention consists of an animal trap comprising an inlet passage, doors placed at the ends of the passage, a receptacle adjacent to the inlet opening, a passage from the inlet opening to the receptacle, and movable plates arranged adjacent to the passage and connected to the doors whereby the passage may be opened or closed with the movements of the doors; and finally the invention consists of various details of construction, whereby the objects of the invention are attained.

The invention is illustrated in the accompanying drawings, in which—

Figure 1, is a side view of a trap constructed in accordance with my invention, the side of the casing of the trap being broken away to show the interior arrangement of the parts, the trap being shown in position ready for use, in full lines, and by dotted lines, in the position assumed when an animal is in the trap. Fig. 2, is a side view of one of the lower doors or shutters removed from the trap; and Fig. 3, is a side view of one of the upper doors or shutters.

In the drawings A, represents the frame or casing of the trap, which in the present embodiment of the invention is divided into the entrance portion $a$, and the chamber or receptacle, $a'$, connected by a passage $a^2$. The entrance portion $a$, of the frame extends entirely through the trap, in order that an animal will have no hesitation in entering the trap. At each end of the entrance are arranged two doors B, B', pivoted or hinged respectively to the lower and upper parts of the entrance.

Connected to the doors B, by hinges or the like, a short distance inward from the point at which the doors are pivoted, are plates C, which form a platform constituting the floor of the entrance portion of the trap. The lower faces of the plates bear upon projections $c$, extending upward from the bottom of the case of the trap, and these form a fulcrum on which the plates C, move when the trap is operated. The inner end of each plate C, is provided with a projection $c'$, extending over the top of the opposite plate so that the plates are caused to move downward together.

The lower doors B, have connected with them shutters D, which when the parts are in their normal positions close the passage way $a^2$, and which have their inner ends moved upward to open the passage way when the doors are closed.

The lower doors B, have attached to them pins $b$, which, when the trap is set occupy a substantially vertical position, and the upper doors B', are provided with projections $b'$, having bent ends $b^2$, coming in contact with pins $b$. By the arrangement of the pins $b$, and projections $b'$, the upper doors are held in a raised position until the trap is operated. When this takes place the pins $b$, are moved outward, releasing the projections $b'$, and allowing the doors B' to fall.

The operation of the trap is as follows: The weight of a mouse, rat, or other animal coming on the plates C, the inner ends of the same are depressed and consequently the lower doors are raised and the shutters D, connected with the doors are also raised opening the passage way $a^2$. As the lower doors are raised the projections $b'$ on the doors B' are released allowing the upper doors to meet the lower ones and completely close the opening at each end of the passage way. The parts remain in the positions to which they are thus moved until the animal enters the chamber $a'$, when by reason of the weight of the doors B, and shutters D, being greater than that of the plates C and the doors B', the parts will be returned to their normal positions.

Having thus described my invention, what I claim as new, and desire to secure by Letters Patent, is—

1. An animal trap comprising an inlet passage extending through the trap in a straight line, doors pivoted to the top and the bottom of each entrance, and a platform arranged in the passage and connected to the doors, substantially as described.

2. An animal trap comprising an inlet passage, a door pivotally attached to the bottom of the entrance to the passage and having an upward projection, a door attached to the upper portion of the entrance and having a projection engaging that on the lower door, and a platform connected to the lower door, substantially as described.

3. An animal trap having an entrance opening, doors placed at the ends of the opening, a receptacle adjacent to the entrance opening, a passage from the entrance to the receptacle, and movable plates arranged adjacent to the passage and connected to the doors, substantially as described.

4. An animal trap comprising an inlet passage extending through the trap in a straight line, doors pivoted to the top and to the bottom of each entrance, two platforms, one connected to the doors at each entrance, and having projections at their inner meeting edges, substantially as described.

5. An animal trap comprising an inlet passage extending through the trap in a straight line, doors pivoted to the top and to the bottom of each entrance, movable platforms arranged in the passage, connected to the doors, and having their inner ends connected, an inner compartment or receptacle, an opening connecting the inlet passage and the receptacle, and plates connected to the doors and adapted to open and close the passage, substantially as described.

In testimony whereof I affix my signature in presence of two witnesses.

PHILANDER H. SISSON.

Witnesses:
JNO. T. MATHEWS,
GEORGE CLAPPERTON.